(12) United States Patent
Fladmark et al.

(10) Patent No.: US 10,316,623 B2
(45) Date of Patent: Jun. 11, 2019

(54) METHOD AND SYSTEM FOR CONTROLLING WELL OPERATIONS

(71) Applicant: MHWIRTH AS, Kristiansand (NO)

(72) Inventors: Jon Rune Fladmark, Soegne (NO); Marius Kjoelleberg, Grimstad (NO)

(73) Assignee: MHWIRTH AS, Kristiansand (NO)

( * ) Notice: Subject to any disclaimer, the term of this patent is extended or adjusted under 35 U.S.C. 154(b) by 224 days.

(21) Appl. No.: 15/317,976

(22) PCT Filed: May 29, 2015

(86) PCT No.: PCT/NO2015/050096
§ 371 (c)(1),
(2) Date: Dec. 12, 2016

(87) PCT Pub. No.: WO2015/190934
PCT Pub. Date: Dec. 17, 2015

(65) Prior Publication Data
US 2017/0114618 A1    Apr. 27, 2017

(30) Foreign Application Priority Data

Jun. 13, 2014  (NO) .................................. 20140740

(51) Int. Cl.
*G06F 11/20* (2006.01)
*E21B 41/00* (2006.01)
*G05B 19/05* (2006.01)

(52) U.S. Cl.
CPC .......... *E21B 41/0092* (2013.01); *E21B 41/00* (2013.01); *G05B 19/052* (2013.01); *G06F 11/2007* (2013.01); *G06F 11/2038* (2013.01); *G05B 2219/13167* (2013.01); *G05B 2219/14014* (2013.01); *G06F 2201/815* (2013.01)

(58) Field of Classification Search
None
See application file for complete search history.

(56) References Cited

U.S. PATENT DOCUMENTS

| | | | | |
|---|---|---|---|---|
| 7,881,869 | B2 * | 2/2011 | Clayton ............. | G05B 23/0262 702/18 |
| 8,015,432 | B1 * | 9/2011 | Vaidya ................ | G06F 11/2038 714/4.11 |
| 2004/0075566 | A1 * | 4/2004 | Stepanik ................ | G08B 21/12 340/632 |

(Continued)

FOREIGN PATENT DOCUMENTS

| | | |
|---|---|---|
| EP | 2 527 587 A2 | 11/2012 |
| WO | WO 2008/127845 A1 | 10/2008 |

OTHER PUBLICATIONS

Wikipedia, "SCADA From Wikipedia", Wikipedia, Apr. 14, 2014, pp. 1-10.*

(Continued)

*Primary Examiner* — Isaac T Tecklu
(74) *Attorney, Agent, or Firm* — Norman B. Thot

(57) ABSTRACT

A method for improving a redundancy and an uptime in a SCADA network for controlling a well operation includes executing control systems for the well operation in identical virtual simulated environments on at least two servers, storing all data for the control systems in a designated redundant cluster storage system, and setting-up the at least two servers with a load balancing.

6 Claims, 2 Drawing Sheets

(56) References Cited

U.S. PATENT DOCUMENTS

| | | | |
|---|---|---|---|
| 2004/0243650 A1* | 12/2004 | McCrory | G06F 9/5061 |
| 2007/0198223 A1* | 8/2007 | Ella | G06Q 10/06 |
| | | | 702/188 |
| 2007/0241931 A1* | 10/2007 | Compton | G05B 19/4185 |
| | | | 340/870.11 |
| 2009/0210814 A1* | 8/2009 | Agrusa | G05B 23/0267 |
| | | | 715/772 |
| 2010/0165878 A1* | 7/2010 | Soni | G05B 19/052 |
| | | | 370/254 |
| 2010/0332664 A1 | 12/2010 | Yevmenkin et al. | |
| 2011/0039237 A1* | 2/2011 | Skare | G05B 23/0267 |
| | | | 434/118 |
| 2012/0173218 A1* | 7/2012 | Shafer | E21B 41/00 |
| | | | 703/7 |
| 2012/0303326 A1* | 11/2012 | Waid | E21B 41/00 |
| | | | 702/188 |
| 2013/0175030 A1* | 7/2013 | Ige | E21B 43/128 |
| | | | 166/250.15 |
| 2013/0333880 A1* | 12/2013 | Raglin | E21B 47/0007 |
| | | | 166/250.01 |
| 2014/0040657 A1* | 2/2014 | Kiessling | G06F 11/0709 |
| | | | 714/4.1 |
| 2015/0148919 A1* | 5/2015 | Watson | G06N 7/005 |
| | | | 700/31 |
| 2016/0178800 A1* | 6/2016 | Ramsay | E21B 43/00 |
| | | | 702/12 |

OTHER PUBLICATIONS

"SCADA", Wikipedia, https://en.wikipedia.org/SCADA, pp. 1-10, Version dated Apr. 14, 2014.

E. Chacón et al.: "Coordination and optimization in oil and gas production complexes", Computers in Industry, vol. 53, pp. 17-37 (2004).

T. Zhao et al.: "Practical Considerations of Applying IEC61850 GOOSE Based Zone Selective Interlocking Scheme in Industrial Applications", 66th Annual Conference for Protective Relay Engineers, pp. 263-270 (2013).

* cited by examiner

METHOD AND SYSTEM FOR CONTROLLING WELL OPERATIONS

CROSS REFERENCE TO PRIOR APPLICATIONS

This application is a U.S. National Phase application under 35 U.S.C. § 371 of International Application No. PCT/NO2015/050096, filed on May 29, 2015 and which claims benefit to Norwegian Patent Application No. 20140740, filed on Jun. 13, 2014. The International Application was published in English on Dec. 17, 2015 as WO 2015/190934 A1 under PCT Article 21(2).

FIELD

The present invention relates to a process and to a system to increase redundancy and uptime for monitoring and control of well operations. More specifically, a virtualization of processes for well operations to increase redundancy and uptime where operations are controlled and monitored over a SCADA network is disclosed.

BACKGROUND

SCADA (Supervisory Control and Data Acquisition) is a system that operates with coded signals over the communication lines to provide safe control and monitoring of remote equipment. Such a system can be combined with a data acquisition system using coded signals over the communication lines to acquire information about the status of a remote device that appears on a display and/or is being stored.

SCADA is a type of industrial control system (ICS). These are computer-based systems that monitor and control industrial processes in the physical world. SCADA differs from other ICS systems in that SCADA governs large-scale processes that can include a plurality of locations over great distances. This includes, for example, the control and monitoring of well operations.

There are currently two ways to run a SCADA network. A SCADA network can either be run using SoftPLC, i.e., PLC (Programmable Logic Controller) software running on a PC, or using "Hard PLC", which is a PLC implemented in hardware such as, for example, PLC units supplied by Siemens.

Several examples of virtualization by various processes also exist for well operations. US 2012/173218 A1 describes the virtualization of drilling equipment with the purpose of testing equipment and detecting errors. Virtualization of PLCs or methods to achieve increased redundancy is, however, not taken into account.

In today's solutions, physical components are used for communication between servers and PLCs regardless of whether the latter are software- or hardware-based PLCs. By taking advantage of a virtual solution according to the present invention, where the PLCs are included, the system will be less vulnerable in that all communication will take place within the virtual host clusters. This reduces the possibility of a "single point of failure" such as, for example, the rupture of a communications cable.

SUMMARY

An aspect of the present invention is to provide greater redundancy, improved uptime, and greater security in a SCADA system.

In an embodiment, the present invention describes a method for improving a redundancy and an uptime in a SCADA network for controlling a well operation which includes executing control systems for the well operation in identical virtual simulated environments on at least two servers, storing all data for the control systems in a designated redundant cluster storage system, and setting-up the at least two servers with a load balancing.

BRIEF DESCRIPTION OF THE DRAWINGS

The present invention is described in greater detail below on the basis of embodiments and of the drawings in which.

DETAILED DESCRIPTION

Figure 1:
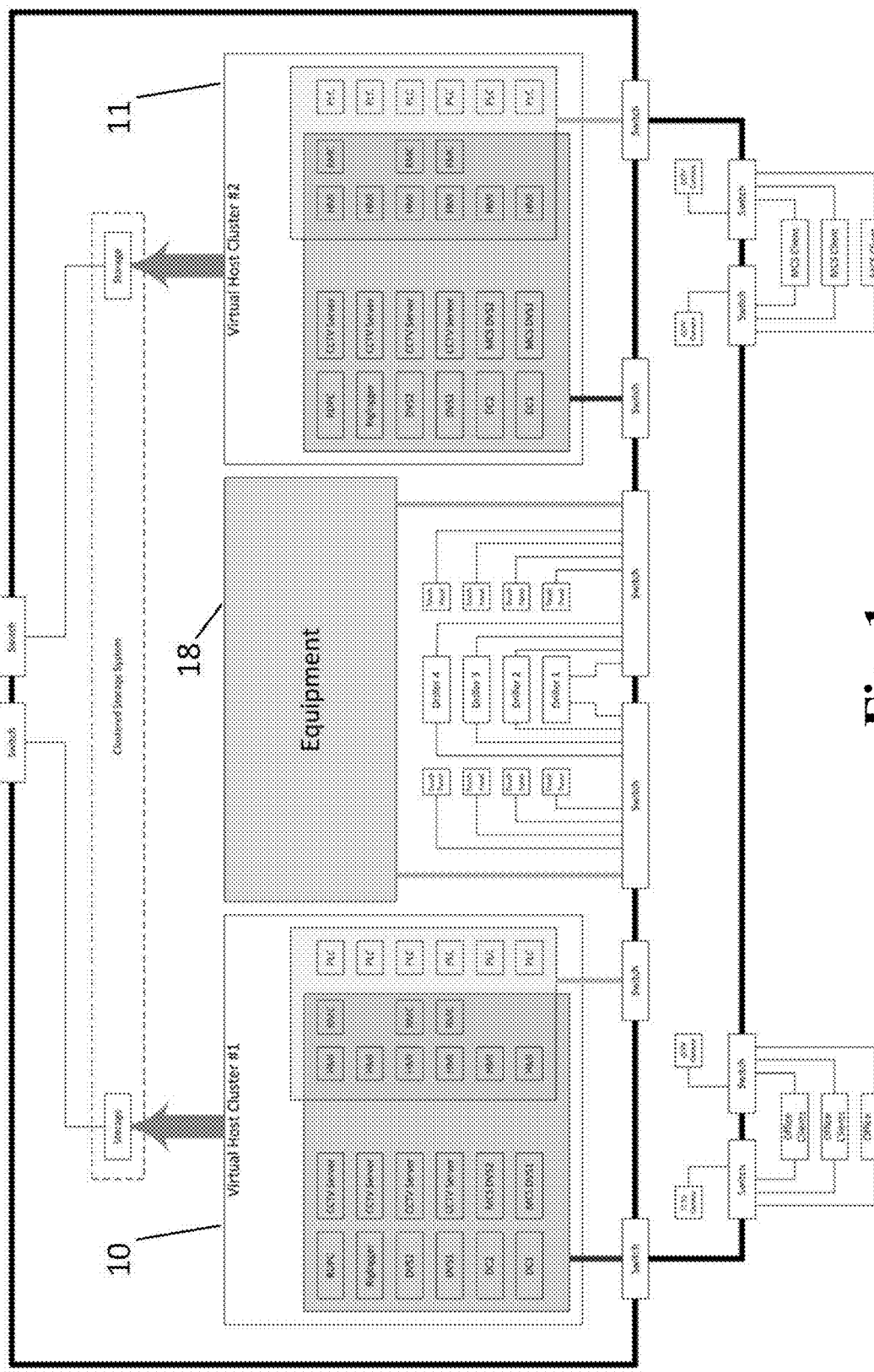
FIG. 1 shows the components included in an embodiment according to the present invention.

The new solution according to the present invention, using virtual host clusters, provides scalable redundancy and is independent of the hardware used. If the hardware used for the solution is no longer adequate, a virtual host cluster can be moved over to a newer platform with a hardware solution with enhanced performance. Taking into account redundancy between multiple virtual host clusters, the upgrade of the hardware will not affect the operation, and no downtime will be required. The solution can be built with two virtual host clusters, but it is also possible to add multiple virtual host clusters if desired or necessary to provide the best possible redundancy.

The present invention is described by a process for increasing redundancy and uptime in a SCADA network for managing well operations. This is characterized by the management and control of well operations being executed in identical virtual simulated environments of at least two servers, where all data for said control are stored in a designated redundant Cluster Storage System, and where said servers are set up with load balancing.

Further embodiments and advantageous features of the method are also described in the appended claims.

The present invention is also described by a system to increase redundancy and uptime in a SCADA network for managing well operations. The system comprises at least two servers running identical virtual simulated environments for management and control of well operations, a designated redundant Cluster Storage System for all data for said management and control systems, as well as means for performing load balancing for the servers.

Further embodiments and advantageous features of the system are described in the appended claims.

The present invention will now be described with reference to the drawings which show an example of a well operation, which in this case is a drilling operation.

As set forth above, a need exists for greater redundancy, improved uptime, and thus greater security in a SCADA system used for controlling and monitoring critical operations such as well operations.

The present invention describes a method to increase the redundancy and uptime in a SCADA network for managing well operations. This is achieved when the management systems of well operations is run in an identical virtual simulated environment on at least two servers, and where all data for the control system is stored in a designated redundant Cluster Storage System, and where the servers are set up with load balancing.

The present invention achieves improved redundancy and uptime by providing a complete solution in a virtual simulated environment where all PLCs can be run as SoftPLS in the virtual environment.

In an embodiment of the present invention, two identical virtual servers load balancing can, for example, be used. A "virtual server" is a hardware-based server running and simulating a virtual environment. Load balancing is a method used in computer networks to distribute workload over a plurality of data resources, such as computers, computer clusters, network links, CPUs, etc. The goal of load balancing is to optimize the use of resources by providing maximum throughput of data, rapid response, and to avoid overloading of some of the resources used in a certain system.

Two alternative solutions for this purpose include Fault Tolerance (FT) and High Availability (HA). By using FT, the best possible redundancy can be achieved where continuous access to resources is provided by a continuously updated shadow image. If a resource should drop out, a seamless transfer to the shadow image is provided. HA works differently; if an active Virtual Cluster Server goes down, the other Virtual Cluster Server will start. This means, however, that about one minute of downtime will exist from the time the first server goes down to the time the other server takes over.

The solution according to the present invention is not limited to two virtual servers. The solution can be expanded to have multiple virtual servers to achieve higher redundancy.

The virtual environments may be implemented in any virtual solution. An example is the use of a VMWare solution where all PLCs run as software-based PLC. VMWare Workstation is a software package that permits users to run a majority of instances of x86 or x86-64-compatible operating systems on a single physical PC.

FIG. 1 shows an example of devices that are part of a well operation such as drilling. Virtual Host Cluster #1 10 and #2 11 each have identical virtual setups with software-related objects that control and monitor the entire physical drilling operation management of the necessary equipment 18. As set forth above, the virtual layouts can be run on a VMWare solution which is installed on a suitable hardware platform. All elements are connected via switches and network with secure communication.

The operation of physical processes can be monitored from multiple locations via monitoring stations.

Figure 2:
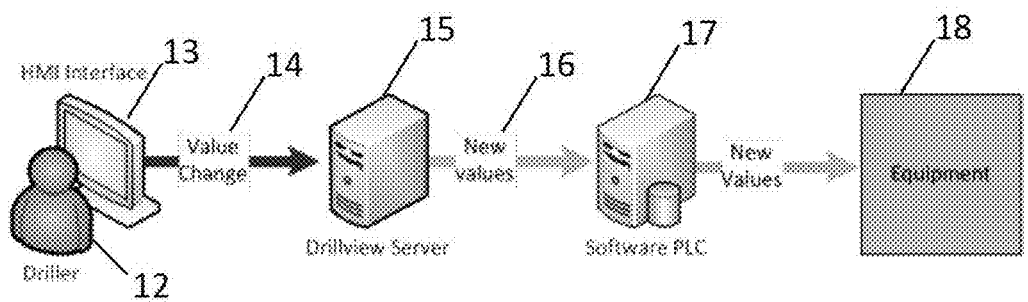
FIG. 2 shows a first way of controlling equipment.

FIG. 2 shows an example of how the control signals are provided from a drilling operator to the equipment. When using the system, the drilling operator 12, who is shown in FIG. 2 as a designated Driller 12, via a PC, sees the status and controls a drilling operation via a HMI (Human Machine Interface) 13. Information about the drilling process is retrieved from a DrillView Server 15. The drilling operator 12 selects instructions from a number of possible operations that are available for the drilling process.

Commands that are executed in the HMI 13 are sent (Value Change 14 in FIG. 2) to a HMI Server and on to the DrillView Server 15, which in FIG. 1 is shown as DVS1 and DVS2. Commands are sent as new values (New values 16) to a software-based PLC 17 which sends control signals to the (drilling) equipment 18.

Figure 3:
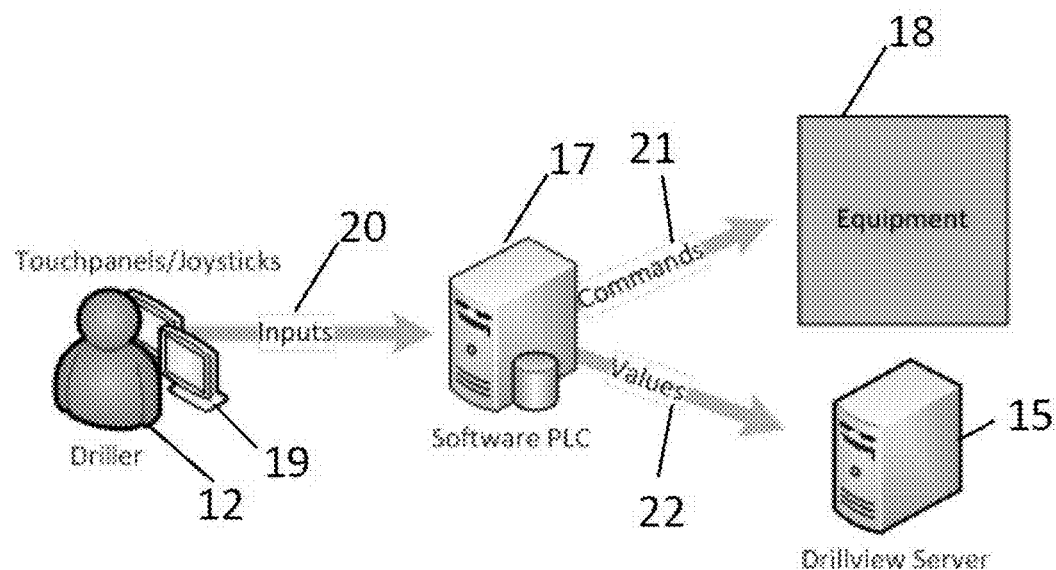
FIG. 3 shows a second way of controlling equipment.

FIG. 3 shows another example of how the control signals are provided from a drilling operator 12 who makes use of touch panels and/or joystick 19 mounted in a driller chair. Input 20 from touch panels and/or joystick 19 is performed via PLC VLAN to the PLC 17. Commands 21 then continue from PLC 17 to equipment 18 via PLC VLAN, while values 22 are updated in the DrillView Server 15 so that one can see what has been done.

The network that connects the various units can, for example, be a redundant physical Gbit LAN which is segregated in multiple VLANs (VLAN-Virtual Local Area Network). By using VLANs, provision is made for extra security in data transmission when multiple VLANs can use the same communication media (Gbit fiber ring) without equipment on different VLANs being able to communicate with each other. A firewall can be used so that equipment on different VLANs can communicate with each other. The firewall is then configured to only allow predefined communication to pass through. This means that if a device on a VLAN is compromised, equipment located on another VLAN will not be affected. Such a network may consist of one or more rings with fiber optic cables. By taking advantage of the ring structure in the fiber network, one can provide redundancy and continued traffic flow in the fiber ring even in the event a cable breaks.

One example of a network with ring structure is a network that is set up with three switches, SW1-SW3 in the following configuration: SW1 <->SW2 <->SW3 <->SW1. This provides a ring structure. If PC1 should communicate with PC2 and where PC1 is connected to SW1 and PC2 is connected to SW2, traffic from PC1 to PC2 will then go from PCI to SW1 to SW2 to PC2. If the connection between SW1 and SW2 breaks down, data traffic from PCI will go to SW1, to SW3, to SW2 and finally to PC2.

Communication between operator Driller PC (HMI Server) and DrillView Server may take place over an HMI VLAN, while communication between DrillView Server and PLC may take over PLC VLAN.

The virtual solution is set up by the use of at least two virtual Host Clusters. A Virtual Host Cluster is a powerful server with a powerful CPU and a large amount of memory, but with little storage. Only virtualization software is stored on the Virtual Host Cluster. When one, as an example, sets up a PLC in a virtualization software like VMWare, one will select in a VMWare image that, for example, the PLC should have four CPU cores and 12 GB of memory available. One then defines that all storage will be conducted in a designated Cluster Storage System.

A Cluster Storage System may, for example, be made up of SAN (Storage Area Network). Other systems will, however, also be covered by the present invention.

According to the present invention, media from each Virtual Host Cluster is collected in a Cluster Storage System. Using a Cluster Storage System, no data will be stored in the Virtual Host Cluster. No equipment or data saved will thus be lost if one should lose a Virtual Host Cluster. Similarly, no data will be lost if there is a need to upgrade hardware. One can then disconnect the existing hardware, install the existing Virtual Host Cluster image, and connect the new hardware on the system.

All key data, the operating system, PLC software, and similar, are stored in the Cluster Storage System.

A Cluster Storage System will now be explained in more detail. When creating a machine in a virtualization software, such as VMWare, it will be saved as an image. By adding these images on a Cluster Storage System instead of the local Virtual Host Cluster, one can provide that multiple Virtual Host Clusters get access to these images. It is this that provides redundancy. If one had located the images locally on the Virtual Host Cluster, they could be lost if the hardware running the Virtual Host Cluster fails. By utilizing a Cluster Storage System, all data which at any time is stored in the storage medium from each Virtual Host Cluster will be kept synchronized.

FIG. 1 also shows a CCTV Camera (Closed Circuit TV) used in various locations for monitoring and controlling an operation. There will be places where operators (Driller 1-4) cannot directly see an operation to be controlled. It is important that CCTV is in place at such locations. CCTV is also used to see what occurred if an incident should occur.

FIG. 1 also shows the Office Clients and MCS (Mud Control System) Clients, which are the same type of clients, but which are commonly placed at various locations. MCS Clients are typically in areas around the Mud Control System. The Clients can in one embodiment of the present invention also be virtualized.

In the virtual environments Virtual Host Cluster #1 and #2, one domain will be running. A Domain is a solution from Microsoft which facilitates administration of servers in that one can send out rule sets and use restrictions via a management server. In the domain, HMI servers will run, as well as PLCs, CCTV servers, log servers (e.g., the Riglogger™ system), Remote Control servers, Robotic Motion Control servers (RMC), MCS, MCS DVS (DrillView™ Server) which is an HMI server for MCS, DC1—Domain Controller 1 management of machines and users on the network, RDPC—Remote Diagnostic PC used for remote support of Equipment. One can then connect to RDPC and debug/assist a customer if errors occur, and possibly other components.

The present invention also includes a system to increase redundancy and uptime in a SCADA network for managing well operations. The system comprises at least two servers running identical virtual simulated environments for management and control of well operations, designated Cluster Storage System storage areas for all data for said management and control systems, as well as means to perform load balancing of said servers. In an embodiment, the network can, for example, be a redundant network such as VLAN.

An example of drilling operations was described in the explanation of the present invention above. The present invention is not, however, only limited to drilling operations, but is suitable for the management of all types of complex well operations in order to improve redundancy and uptime over current solutions. Reference should be had to the appended claims.

What is claimed is:

1. A method for improving a redundancy and an uptime in a Supervisory Control and Data Acquisition (SCADA) network for controlling a well operation, the method comprising:

executing well operation control systems comprising Programmable Logic Controllers (PLCs) configured to interface with well equipment in identical virtual simulated environments on at least two servers;

storing all data for the control systems in a designated redundant cluster storage system;

setting-up the at least two servers with a load balancing; and setting up the Supervisory Control and Data Acquisition (SCADA) network as a redundant local area network.

2. The method as recited in claim 1, wherein the identical virtual simulated environments are configured to run a domain comprising Human Machine Interface (HMI) servers, Programmable Logic Controllers (PLCs), Closed Circuit TV (CCTV) servers, log servers, Remote Control servers, and Robotic Motion Control servers.

3. The method as recited in claim 1, wherein the Supervisory Control and Data Acquisition (SCADA) network is a VLAN (Virtual Local Area Network).

4. The method as recited in claim 1, wherein the well operation is a drilling operation.

5. A well operations control system comprising:

a Supervisory Control and Data Acquisition (SCADA) network;

at least two servers which are configured run identical virtual simulated environments for well operations control systems, the at least two servers comprising Programmable Logic Controllers (PLCs) configured to interface with controlled well equipment;

a designated redundant cluster storage system for storing all data of the well operations control systems; and means for performing a load balancing of the at least two servers wherein, the Supervisory Control and Data Acquisition (SCADA) network is a redundant local area network.

6. The system as recited in claim 5, wherein the Supervisory Control and Data Acquisition (SCADA) network is a VLAN (Virtual Local Area Network).

* * * * *